United States Patent
Han et al.

(10) Patent No.: US 7,312,426 B2
(45) Date of Patent: Dec. 25, 2007

(54) COOKING APPARATUS

(75) Inventors: Dae-Sung Han, Hwasung (KR); Chul Kim, Yongin (KR); Yong-Woon Han, Kunpo (KR); Seong-Deog Jang, Suwon (KR); Kyung-Hee Ham, Seoul (KR); Joo-Yeong Yeo, Hwasung (KR); Han-Seong Kang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 10/687,603

(22) Filed: Oct. 20, 2003

(65) Prior Publication Data

US 2004/0163550 A1 Aug. 26, 2004

(30) Foreign Application Priority Data

Feb. 6, 2003 (KR) ............ 10-2003-0007558

(51) Int. Cl.
*H05B 3/68* (2006.01)
*H05B 3/06* (2006.01)

(52) U.S. Cl. .................... 219/450.1; 219/536

(58) Field of Classification Search ............ 219/443.1, 219/450.1, 452.11, 455.12, 536, 538, 539, 219/541; 99/378, 379, 389, 391, 392, 393, 99/422, 425
See application file for complete search history.

(56) References Cited

U.S. PATENT DOCUMENTS

| | | | |
|---|---|---|---|
| 1,673,296 A | | 6/1928 | McManus |
| 2,030,047 A | * | 2/1936 | Bonzagni et al. ............ 99/339 |
| 2,778,912 A | * | 1/1957 | Palmer et al. ............ 219/521 |
| 3,074,342 A | * | 1/1963 | Wachtel ............ 99/339 |
| 3,152,242 A | | 10/1964 | De Mott |
| 3,154,004 A | | 10/1964 | Huck |
| 3,371,659 A | | 3/1968 | Paspalas |
| 3,630,970 A | | 12/1971 | Nelson |
| 4,450,343 A | * | 5/1984 | Dundon ............ 392/434 |
| 4,508,024 A | | 4/1985 | Perkins |

(Continued)

FOREIGN PATENT DOCUMENTS

FR 2 670 274 6/1992

(Continued)

OTHER PUBLICATIONS

Patent Abstract of KR 16089 dated Mar. 4, 2002.

(Continued)

*Primary Examiner*—Sang Y. Paik
(74) *Attorney, Agent, or Firm*—Staas & Halsey LLP

(57) ABSTRACT

A cooking apparatus includes a heater mounting unit that mounts a heater on a reflecting plate in a simple manner and allows an internal construction of the cooking apparatus to be simple. The cooking apparatus also includes a cabinet, at least one heater mounted in the cabinet, a grill unit positioned on a top of the cabinet to allow food to be cooked while being laid thereon, at least one reflecting plate mounted behind the heater to reflect heat radiated toward a position behind the heater, and at least one elastic mounting unit to mount the heater on the reflecting plate through an elastic deformation thereof. Accordingly, an efficiency of production of the cooking apparatus may be improved, and the cooking apparatus may have a simple internal construction.

7 Claims, 6 Drawing Sheets

U.S. PATENT DOCUMENTS

| | | | |
|---|---|---|---|
| 4,865,864 | A | 9/1989 | Rijswijck |
| 4,893,609 | A | 1/1990 | Giordani et al. |
| 5,189,945 | A | 3/1993 | Hennick |
| 5,372,121 | A | 12/1994 | Castillo |
| 5,535,733 | A | 7/1996 | Hait |
| 6,125,838 | A | 10/2000 | Hedgpeth |
| 6,293,276 | B1 | 9/2001 | Owens et al. |
| 2001/0039884 | A1 | 11/2001 | Backus et al. |

FOREIGN PATENT DOCUMENTS

| | | |
|---|---|---|
| FR | 2 724 833 | 3/1996 |
| GB | 1096730 | 12/1967 |
| GB | 2 286 111 | 8/1995 |

OTHER PUBLICATIONS

Japanese Abstract 2001-120440 dated May 8, 2001.

Japanese Abstract 2000-254007 dated Sep. 19, 2000.

Japanese Abstract 2000-166771 dated Jun. 20, 2000.

Japanese Abstract 03-026216 dated Feb. 4, 1991.

U.S. Appl. No. 10/736,836, filed Dec. 17, 2003, Han et al., Samsung Electronics Co. Ltd.

U.S. Appl. No. 10/659,380, filed Sep. 11, 2003, Han et al., Samsung Electronics Co., Ltd.

U.S. Appl. No. 10/681,132, filed Oct. 9, 2003, Han et al., Samsung Electronics Co., Ltd.

U.S. Appl. No. 10/681,136, filed Oct. 9, 2003, Han et al., Samsung Electronics Co., Ltd.

U.S. Appl. No. 10/682,548, filed Oct. 10, 2003, Han et al., Samsung Electronics Co., Ltd.

U.S. Appl. No. 10/689,746, filed Oct. 22, 2003, Han et al., Samsung Electronic Co., Ltd.

U.S. Appl. No. 10/691,551, filed Oct. 24, 2003, Han et al., Samsung Electronics Co., Ltd.

U.S. Appl. No. 10/705,893, filed Nov. 13, 2003, Han et al., Samsung Electronics Co., Ltd.

U.S. Appl. No. 10/706,926, filed Nov. 14, 2003, Han et al., Samsung Electronics Co., Ltd.

U.S. Appl. No. 10/731,159, filed Nov. 17, 2003, Han et al., Samsung Electronics Co., Ltd.

European Search Report from European Patent Office dated Nov. 5, 2003.

Japanese Patent Abstract Publication No. 11-267032, Published Oct. 5, 1999.

Korean Patent Abstract Publication No. 2002-16089, Published Mar. 4, 2002.

* cited by examiner

US 7,312,426 B2

COOKING APPARATUS

CROSS-REFERENCE TO RELATED APPLICATIONS

This application claims the priority of Korean Patent Application No. 2003-7558, filed Feb. 6, 2003, in the Korean Intellectual Property Office, the disclosure of which is incorporated herein by reference.

BACKGROUND OF THE INVENTION

1. Field of the Invention

The present invention relates, in general, to a cooking apparatus and, more particularly, to a heater mounting unit for a cooking apparatus.

2. Description of the Related Art

Generally, meats or processed meat tastes best when cooked on a grill.

A conventional cooking apparatus using the grill includes a cabinet, ceramic heaters placed in both side portions of the cabinet, a grill unit positioned on a top of the cabinet to support food to be cooked by heat thereon, and reflecting plates mounted behind the ceramic heaters to reflect heat radiated toward a position behind the ceramic heaters to the grill unit.

Each of the ceramic heaters has a projection at a center of a rear side thereof. A power supply line is connected to the ceramic heater through the projection. The reflecting plates are each provided with a receiving hole into which the projection is inserted. The projection is provided with a clip groove provided in an edge thereof to receive a plate-shaped clip therein, and a leaf spring designed to be elastically disposed to fix the clip inserted into the clip groove to the reflecting plate, thus mounting the ceramic heater on the reflecting plate.

However, a conventional cooking apparatus as described above is problematic in that a structure to mount the ceramic member on the reflecting plate is complicated. Thus, too much time is required to manufacture and assemble the cooking apparatus.

Additionally, the conventional cooking apparatus is generally connected to an external power supply through a back of the cabinet. In this case, power supply lines are positioned lengthwise through side portions of the cabinet, thus causing an assembly process and an internal construction of the cooking apparatus to be complicated.

SUMMARY OF THE INVENTION

Accordingly, it is an aspect of the present invention to provide a cooking apparatus provided with a heater mounting unit that mounts a heater on a reflecting plate in a simple manner and allows an internal construction of the cooking apparatus to be simple.

Additional aspects and advantages of the invention will be set forth in part in the description which follows and, in part, will be obvious from the description, or may be learned by practice of the invention.

The foregoing and/or other aspects of the present invention are achieved by providing a cooking apparatus including a cabinet, at least one heater mounted in the cabinet, a grill unit positioned on a top of the cabinet to allow food to be cooked while being laid thereon, at least one reflecting plate mounted behind the heater to reflect heat radiated toward a position behind the heater, and at least one elastic mounting unit to mount the heater on the reflecting plate through elastic deformation thereof.

According to an aspect of the invention, the elastic mounting unit includes at least one pair of elastic parts and the elastic parts each have a fixed end that is fixed to the reflecting plate and a free end that is elastically movable. The heater is held between the free ends of the pair of elastic parts through elastic deformation of the free ends of the pair of elastic parts. In this case, the free ends of the elastic parts are elastically deformed to hold upper and lower portions of the heater. Additionally, the free ends of the elastic parts have heater seats so that the upper and lower portions of the heater are inserted thereinto and seated thereon by a certain extent.

According to an aspect of the invention, the elastic mounting unit includes at least one elastic part, and the elastic part has a fixed end that is fixed to the reflecting plate and two free ends that are elastically movable. The heater is held between the free ends through elastic deformation of the free ends. In this case, the free ends of the elastic part are elastically deformed to hold upper and lower portions of the heater, respectively. Additionally, the free ends of the elastic part have extended parts extended to face each other at both ends of the free ends, respectively, in order to prevent the heater from being removed from the elastic mounting unit, and the fixed end of the elastic part has a support part that is projected to support a back of the heater so as to firmly support the heater.

According to an aspect of the invention, the heater is provided on a back thereof with power supply terminals.

BRIEF DESCRIPTION OF THE DRAWINGS

The above and/or other aspects and advantages of the present invention will become apparent and more appreciated from the following detailed description of the preferred embodiments, taken in conjunction with the accompanying drawings of which.

DETAILED DESCRIPTION OF THE PREFERRED EMBODIMENTS

Figure 1:
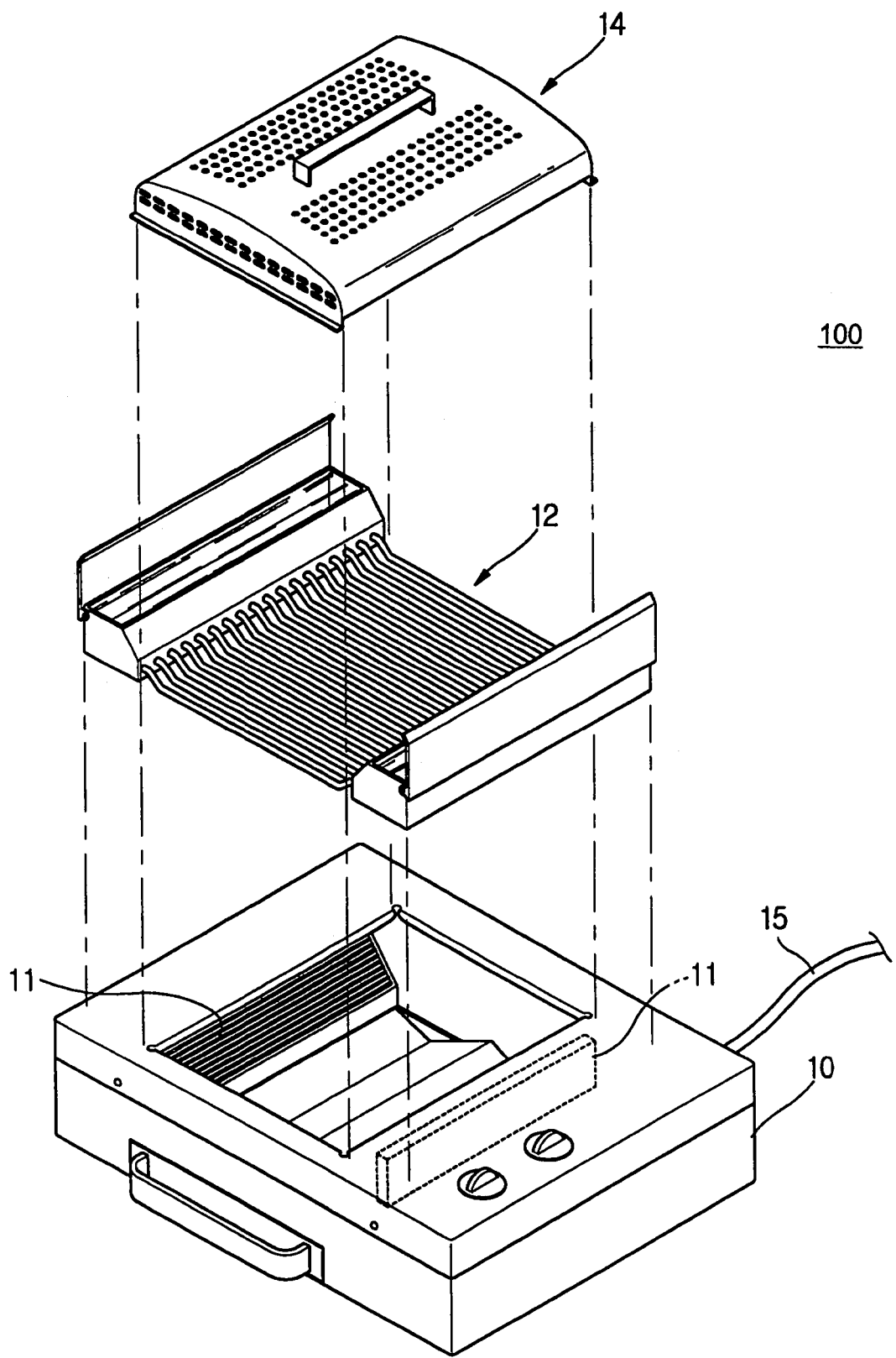
FIG. 1 is an exploded perspective view of a cooking apparatus, according to an embodiment of the present invention.

Reference will now be made in detail to the present preferred embodiments of the present invention, examples of which are illustrated in the accompanying drawings, wherein like reference numerals refer to like elements throughout. Hereinafter, preferred embodiments according to the present invention will be described in detail with reference to the accompanying drawings.

Figure 2:
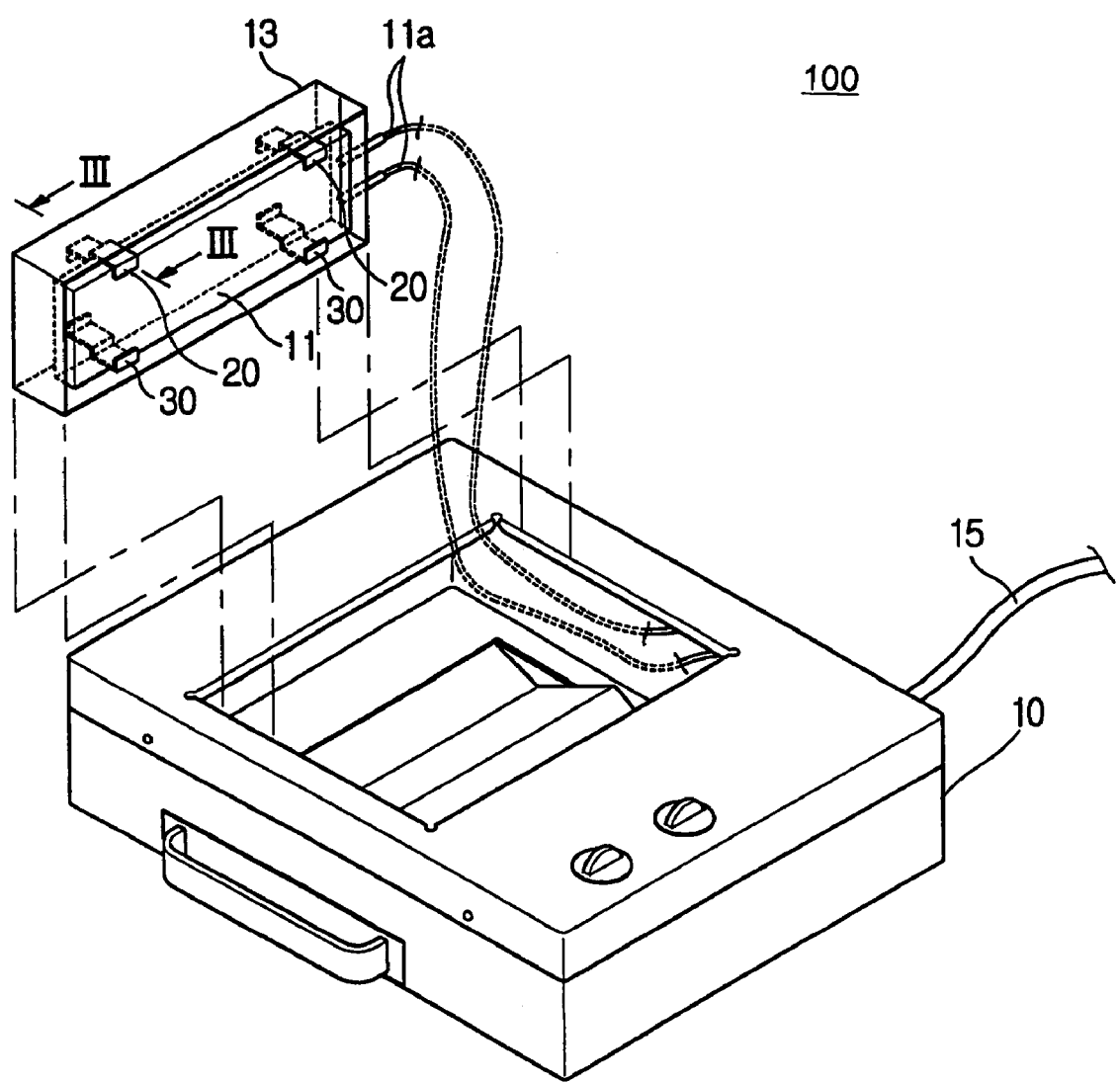
FIG. 2 is a perspective view of the cooking apparatus of FIG. 1 with characteristic parts exploded therefrom.

FIG. 1 is an exploded perspective view of a cooking apparatus 100, according to an embodiment of the present invention. FIG. 2 is a perspective view of the cooking apparatus of FIG. 1 with characteristic parts exploded therefrom.

Referring to FIGS. 1 and 2, the cooking apparatus 100 according to the embodiment of the present invention includes a cabinet 10, two ceramic heaters 11, a grill unit 12, two reflecting plates 13, a plurality of elastic mounting units, and a cover 14. The ceramic heaters 11 are placed in side portions of the cabinet 10, and are each provided on a back thereof with power supply terminals 11a. The grill unit 12 is positioned on a top of the cabinet 10 to support food to be cooked thereon. The reflecting plate 13 is situated behind each of the ceramic heaters 11 to reflect heat radiated toward a position behind each of the ceramic heaters 11 to the grill unit 12 (see FIG. 2). The elastic mounting units each include two pairs of upper and lower elastic parts 20 and 30 elastically deformed to hold upper and lower portions of the ceramic heater 11, thus mounting the ceramic heater 11 on the reflecting plate 13. The cover 14 surrounds a space above the grill unit 12.

In the above description, the power supply terminals 11a are positioned on the back of the ceramic heater 11 to simplify the arrangement of an external power supply line 15 connected to a back of the cooking apparatus 100.

Figure 3:
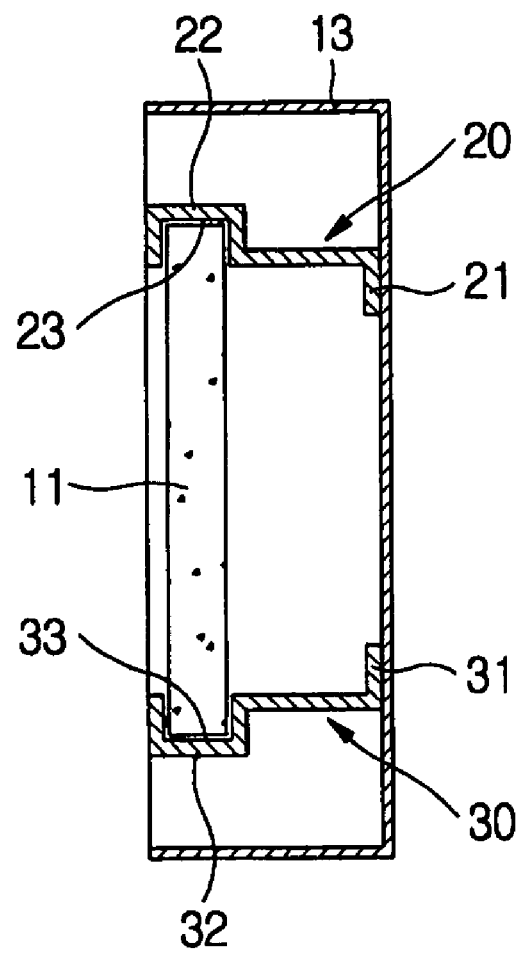
FIG. 3 is a sectional view taken along line 111-111 of FIG. 2.

FIG. 3 is a sectional view taken along line III-III of FIG. 2. As shown in FIG. 3, each elastic mounting unit includes two pairs of the upper and lower elastic parts 20 and 30, and the upper and lower elastic parts 20 and 30 each have a fixed end 21 or 31 that is fixed to the reflecting plate 13 and a free end 22 or 32 that is elastically movable. The free ends 22 and 32 of the upper and lower elastic parts 20 and 30 are elastically deformed to hold the upper and lower portions of the ceramic heater 11. As illustrated in FIG. 3, the free ends 22 and 32 of the upper and lower elastic parts 20 and 30 each have a heater seat 23 or 33 which the upper and lower portions of the ceramic heater 11 are respectively inserted into and seated on by a certain extent. The ceramic heater 11 is inserted into and seated on the heater seats 23 and 33, thus being held between the free ends 22 and 32 of the upper and lower elastic parts 20 and 30 through the elastic deformation of the free ends 22 and 32.

Figure 4A:
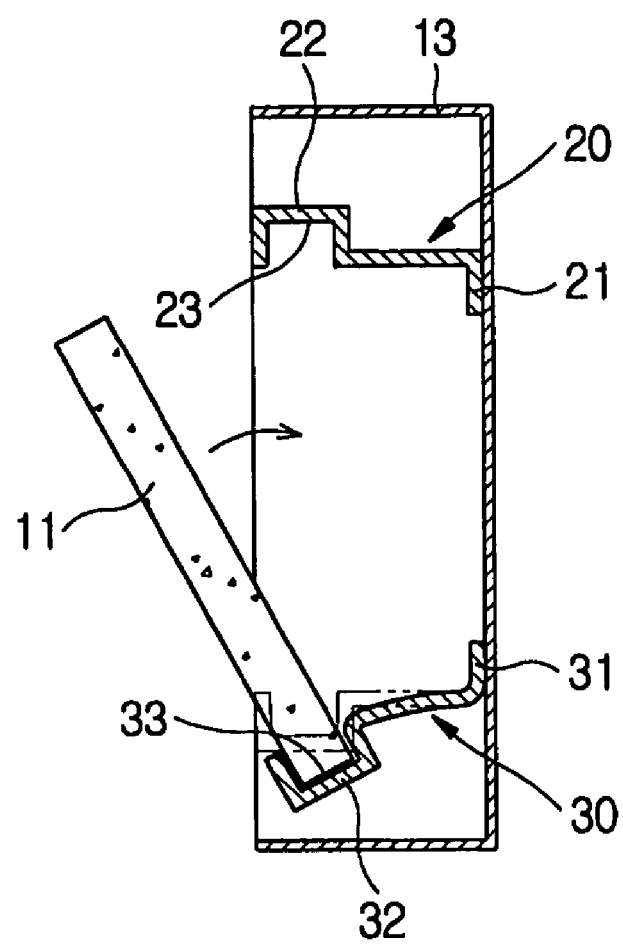
FIGS. 4A and 4B show operations of a construction shown in FIG. 3.
Figure 4B:
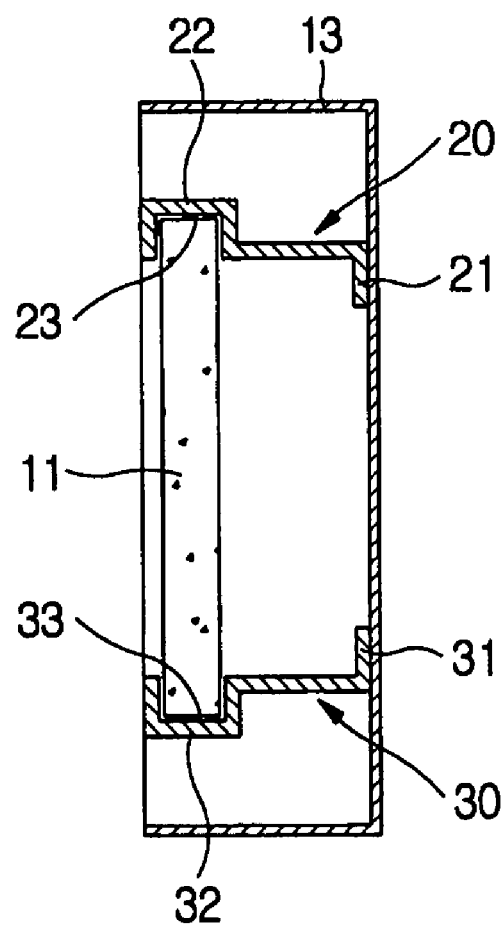

FIGS. 4A and 4B sequentially show a method of mounting the ceramic heater 11 on the elastic mounting unit having two pairs of upper and lower elastic parts 20 and 30. Firstly, as shown in FIG. 4A, a user inserts the lower portion of the ceramic heater 11 into the heater seats 33 of the lower elastic parts 30 of the elastic mounting unit, and applies a certain amount of force in a downward direction so that the upper portion of the ceramic heater 11 is not caught by the upper elastic parts 20 at the time the upper portion of the ceramic heater 11 is inserted into the heater seats 23. Thereafter, if the upper portion of the ceramic heater 11 is pushed in a direction of the deflecting plate 13, that is, in the direction shown by an arrow in FIG. 4A, and the force applied to the lower elastic parts 30 is removed, the upper portion of the ceramic heater 11 is inserted into and seated on the heater seats 23 of the upper elastic parts 20. Accordingly, the ceramic heater 11 is mounted on the reflecting plate 13 in a state as shown in FIG. 4B in a simple manner.

Figure 5:
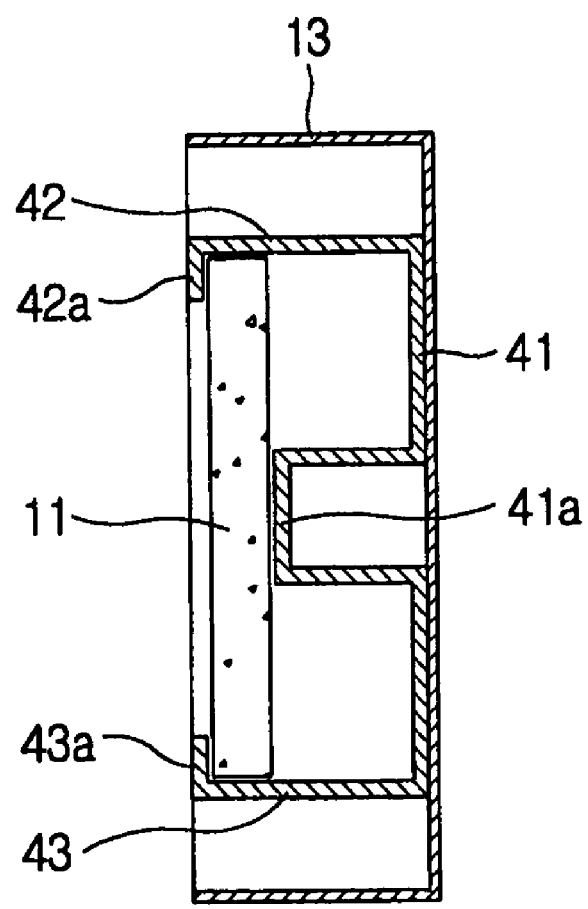
FIG. 5 is a sectional view of a elastic mounting unit, according to another embodiment of the present invention.

FIG. 5 is a sectional view of an elastic mounting unit through the use of which the ceramic heater 11 is mounted on the reflecting plate 13, according to another embodiment of the present invention. As shown in FIG. 5, the elastic mounting unit includes two elastic parts, and the elastic parts each have a fixed portion 41 that is fixed to the reflecting plate 13 and two free ends 42 and 43 that are elastically movable. The ceramic heater 11 is seated between the free ends 42 and 43 through the elastic deformation of the free ends 42 and 43. In this case, the free ends 42 and 43 have extended parts 42a and 43a that are extended to face each other at both ends of the free ends 42 and 43, respectively, so as to prevent the ceramic heater 11 from being removed from the elastic mounting unit. The fixed portion 41 includes a support part 41a that is projected to support the back of the ceramic heater 11 50 as to firmly support the ceramic heater 11. Accordingly, the fixed portion 41 serves as the heater seat of the elastic mounting unit shown in FIG. 3. In the case where a cooking apparatus having the elastic mounting unit as shown in FIG. 5 is assembled, a process of assembling the cooking apparatus is similar to that described with reference to FIGS. 3 and 4.

As is apparent from the above description, the present invention provides a cooking apparatus, in which a heater is assembled to a cooking unit in a simple manner, thereby reducing an assembly time of the cooking apparatus and consequently improving an efficiency of production. Additionally, a heater mounting unit and a power supply line are installed in a simple manner, so that the cooking apparatus may have a simple internal construction.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking apparatus, comprising:
a cabinet;
at least one heater mounted in the cabinet;
a grill unit positioned on a top of the cabinet to allow food to be cooked while being laid thereon;
at least one reflecting plate mounted behind the heater to reflect heat radiated toward a position behind the heater; and
at least one elastic mounting unit to mount the heater on the reflecting plate through an elastic deformation thereof,
wherein the elastic mounting unit comprises at least one elastic part, the elastic part having a fixed portion that is fixed to the reflecting plate and two free ends that are elastically movable, the heater being held between the free ends through an elastic deformation of the free ends,
the free ends of the elastic part are elastically deformed to hold upper and lower portions of the heater, respectively,
the free ends of the elastic part have extended parts extended to face each other at both ends of the free ends, respectively, to prevent the heater from being removed from the elastic mounting unit, and
the fixed portion of the elastic part has a support part that is projected to support a back of the heater so as to firmly support the heater.

2. The cooking apparatus as set forth in claim 1, wherein the heater is provided with power supply terminals on a back of the heater.

3. The cooking apparatus as set forth in claim 1, wherein the hear is a ceramic hear.

4. A cooking apparatus having a cabinet and a plurality of heaters mounted in the cabinet, comprising:
a grill unit being in contact with the cabinet to allow food to be cooked while being laid thereon;
a plurality of reflecting plates mounted behind the respective heaters to reflect heat radiated toward a position behind the respective heaters; and
a plurality of elastic mounting units to mount the respective heaters on the respective plates through an elastic deformation thereof, wherein each of the elastic mounting unit comprise at least one elastic part, the elastic part having a fixed portion that is fixed to the respective reflecting plate and two free ends that are elastically movable, the respective heater being held between the free ends through an elastic deformation of the free ends, the free ends of the elastic part are elastically deformed to hold portions of the heater, respectively, the free ends of the elastic part have extended parts extended to face each other at both ends of the free ends, respectively, to prevent the heater from being removed from the elastic mounting unit, and the fixed portion of the elastic part has a support part that is projected to support a back of the heater so as to firmly support the heater.

5. The cooking apparatus as set forth in claim 4, further comprising:

power supply terminals provided behind the respective heater to supply power to the heater.

6. The cooking apparatus as set forth in claim 4, wherein the free ends and the fixed end are integrally formed in one piece.

7. The cooking apparatus as set forth in claim 4, wherein the support part is integrally formed with the free ends and the fixed end and between pairs of each free end and fixed end.

* * * * *

UNITED STATES PATENT AND TRADEMARK OFFICE
CERTIFICATE OF CORRECTION

PATENT NO.         : 7,312,426 B2
APPLICATION NO. : 10/687603
DATED              : December 25, 2007
INVENTOR(S)        : Dae-Sung Han et al.

It is certified that error appears in the above-identified patent and that said Letters Patent is hereby corrected as shown below:

Column 4, Line 56, after "the" change "hear" to --heater--.

Column 4, Line 56, after "ceramic" change "hear." to --heater.--.

Signed and Sealed this

Twenty-seventh Day of May, 2008

JON W. DUDAS
*Director of the United States Patent and Trademark Office*